(12) United States Patent
Upadhyay et al.

(10) Patent No.: US 8,281,578 B2
(45) Date of Patent: Oct. 9, 2012

(54) METHOD FOR CORRECTING AN ESTIMATE OF NH$_3$ STORED WITHIN A SELECTIVE CATALYST REDUCTION SYSTEM

(75) Inventors: Devesh Upadhyay, Canton, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/071,252

(22) Filed: Mar. 24, 2011

(65) Prior Publication Data

US 2011/0203259 A1 Aug. 25, 2011

(51) Int. Cl.
*F01N 3/00* (2006.01)
(52) U.S. Cl. .............. 60/301; 60/274; 60/277; 60/286; 60/297; 60/303
(58) Field of Classification Search ............ 60/274, 60/276, 286, 295, 297, 301, 303, 277
See application file for complete search history.

(56) References Cited

U.S. PATENT DOCUMENTS

| | | | | |
|---|---|---|---|---|
| 6,427,439 | B1 * | 8/2002 | Xu et al. | 60/286 |
| 6,755,014 | B2 * | 6/2004 | Kawai et al. | 60/286 |
| 7,178,328 | B2 * | 2/2007 | Solbrig | 60/286 |
| 7,707,824 | B2 * | 5/2010 | Solbrig | 60/286 |
| 7,997,070 | B2 * | 8/2011 | Yasui et al. | 60/295 |
| 8,061,126 | B2 * | 11/2011 | Gady et al. | 60/286 |

OTHER PUBLICATIONS

Upadhyay, Devesh et al., "Method for Estimating Slippage of a Selective Catalyst Reduction System," U.S. Appl. No. 13/071,321, filed Mar. 24, 2011, 40 pages.

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

A method for correcting an estimated amount of NH$_3$ store within a SCR is described. In one example, SCR efficiency is determined from a NOx sensor output and the estimated amount of NH$_3$ is corrected based on the SCR efficiency. Engine emissions may be reduced via improving the estimated NH$_3$ storage level, at least during some conditions.

20 Claims, 6 Drawing Sheets

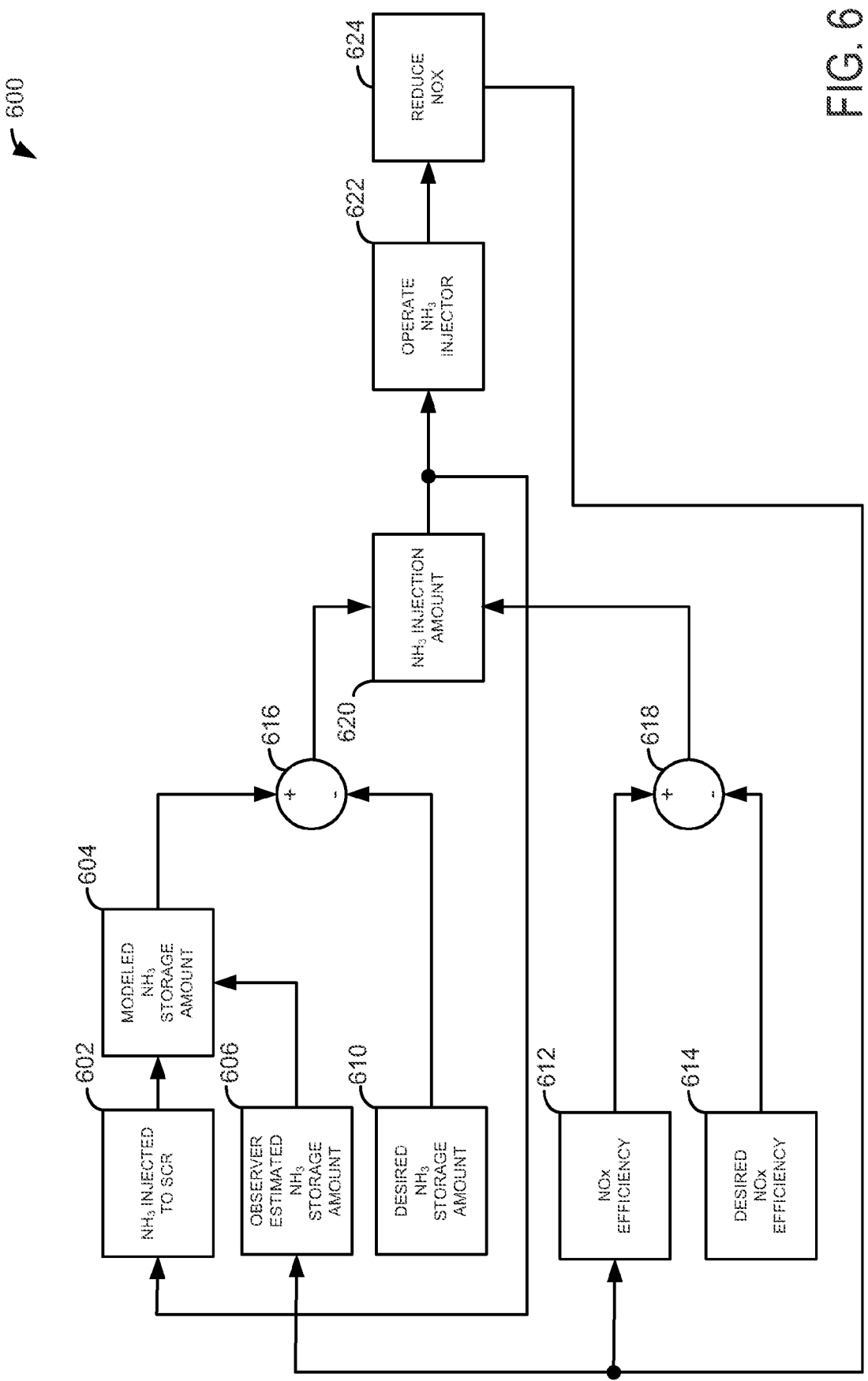

METHOD FOR CORRECTING AN ESTIMATE OF NH₃ STORED WITHIN A SELECTIVE CATALYST REDUCTION SYSTEM

BACKGROUND/SUMMARY

Nitrogen oxides (e.g., NOx) contained in engine exhaust gases may be treated via a selective reduction catalyst (SCR) in the vehicle's exhaust system to form $N_2$ and $H_2O$. The SCR may co-operate with a reductant such as ammonia ($NH_3$) to reduce the NOx. However, if there is an insufficient amount of $NH_3$ present at the SCR, a higher amount of NOx than is desirable may pass through the SCR. On the other hand, if excess $NH_3$ is directed to the SCR, $NH_3$ may slip past the SCR. Sensing an amount of $NH_3$ stored in a SCR may be difficult since the SCR may have a large surface area. Therefore, it may be desirable to estimate the amount of $NH_3$ stored within the SCR. Control actions (e.g., adjusting an amount of $NH_3$ injected to an exhaust system) can be taken based on the amount of $NH_3$ stored within the SCR can be once the amount of $NH_3$ stored within the SCR is estimated. However, the control actions may not perform as is desired if the estimated amount of $NH_3$ stored within the SCR deviates from the actual amount of $NH_3$ stored within the SCR by more than a threshold amount.

The inventors herein have recognized the above-mentioned disadvantages and have developed a method for correcting an estimate of $NH_3$ stored within a SCR. In one example, the method corrects an estimated amount of $NH_3$ stored within the SCR in response to an indication of $NH_3$ slip. The indication of $NH_3$ slip may be provided via a sensor located downstream of the SCR (e.g. the sensor is located downstream of the SCR according to the direction of exhaust flow). Alternatively, the estimated amount of $NH_3$ stored within the SCR may be corrected in response to SCR efficiency.

By correcting an estimate of $NH_3$ stored within a SCR it may be possible to improve SCR conversion efficiency. For example, if the estimated amount of $NH_3$ stored within a SCR is improved, injection of $NH_3$ into the exhaust system can be started or ceased before NOx or $NH_3$ slips past the SCR. In particular, if the estimated amount of $NH_3$ stored within the SCR is low, injection of $NH_3$ can be started and/or increased. If the estimated amount of $NH_3$ stored within the SCR is high, the injection of $NH_3$ to the exhaust system can be ceased and/or reduced. As a result, less $NH_3$ and/or NOx may slip past the SCR.

The present description may provide several advantages. Specifically, the approach may reduce the consumption of $NH_3$ since injection of $NH_3$ may be stopped before $NH_3$ slips pass the SCR. Consequently, the vehicle operator may be able to reduce the number of times a $NH_3$ supply tank is refilled. Further, engine NOx and $NH_3$ emissions may be reduced since the supply of $NH_3$ to the SCR may be increased before higher levels of NOx slippage occur so as to reduce the amount of NOx escaping to atmosphere. Similarly, the supply of $NH_3$ to the SCR may be decreased before higher levels of $NH_3$ slippage occur so as to reduce the amount of $NH_3$ escaping to atmosphere.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 6 shows a block diagram of a controller for supplying $NH_3$ to a SCR.

DETAILED DESCRIPTION

Figure 1:
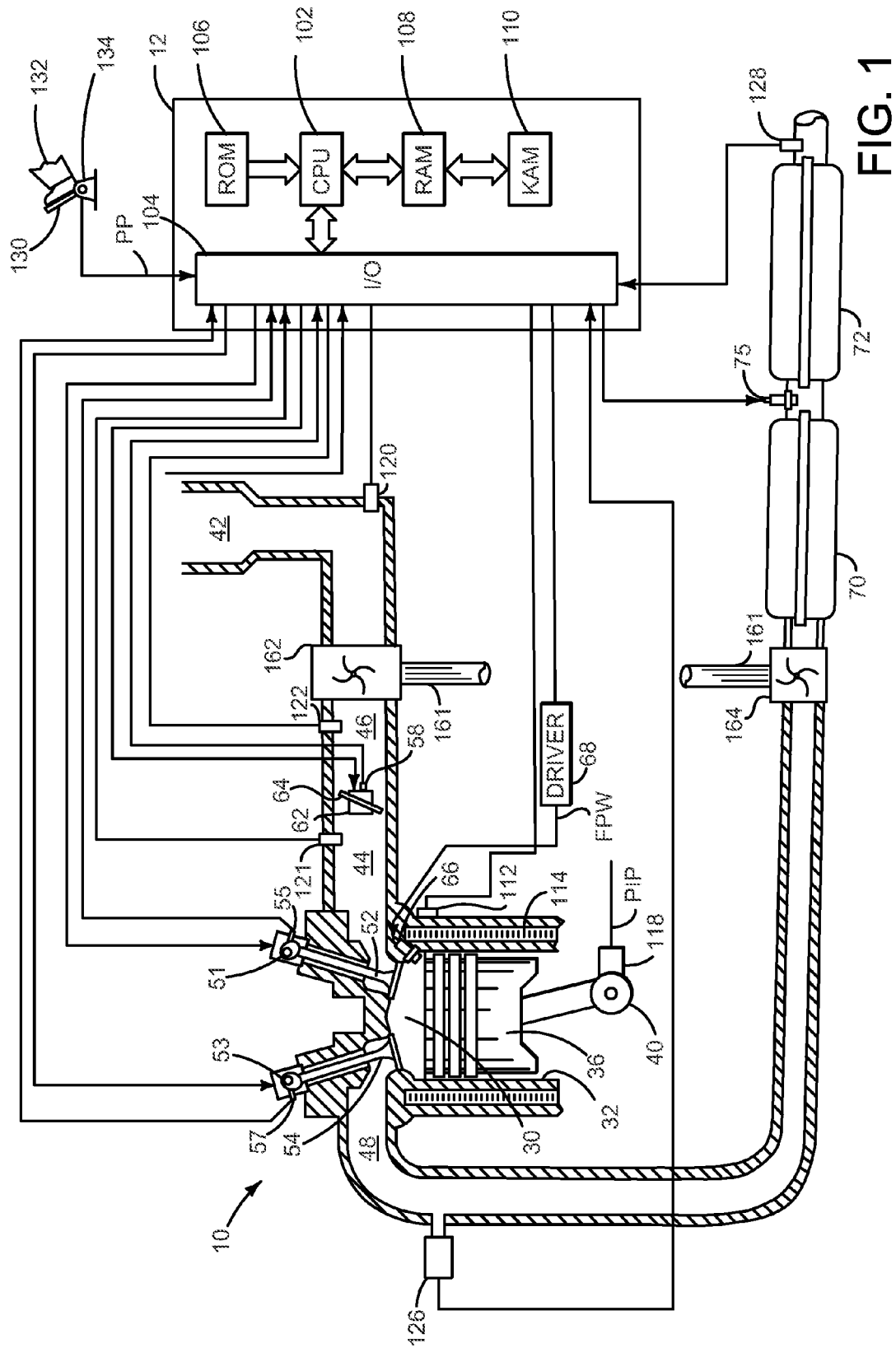
FIG. 1 shows a schematic depiction of an engine.
Figure 2:
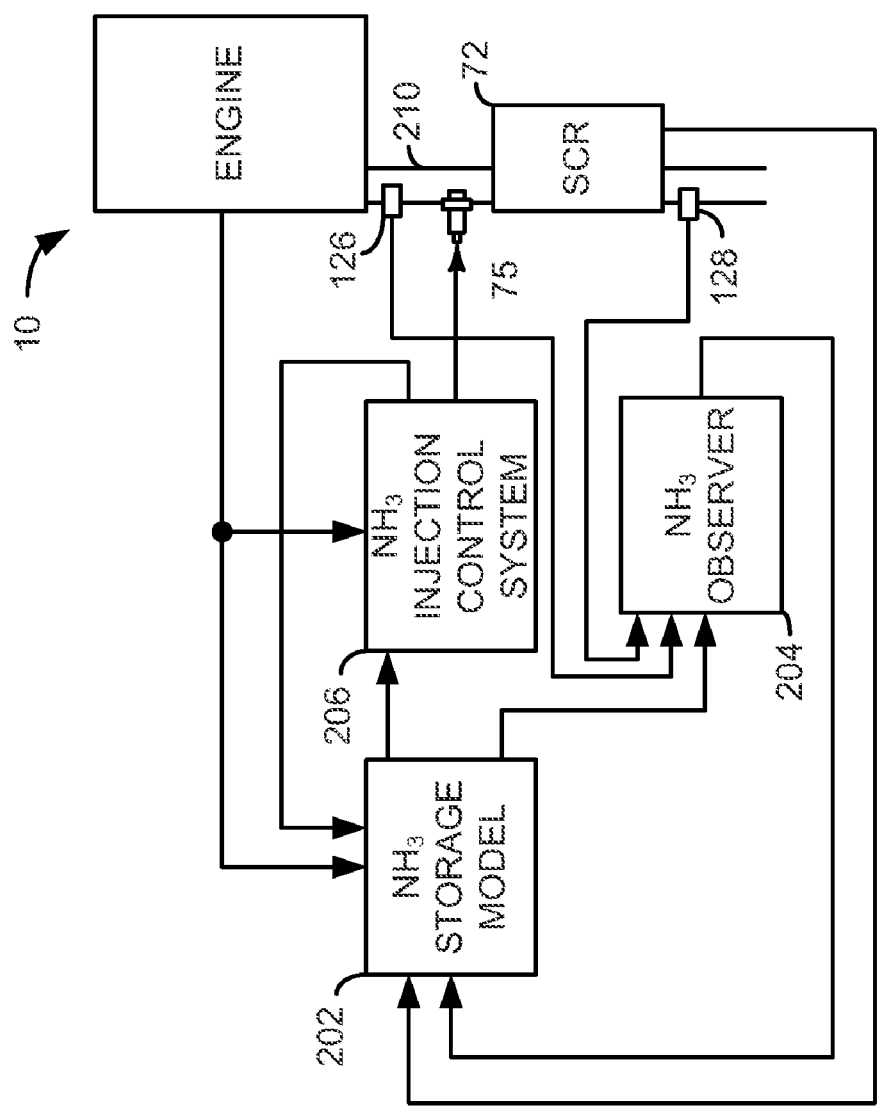
FIG. 2 shows a block diagram of an example diagram of a SCR control system.
Figure 3B:
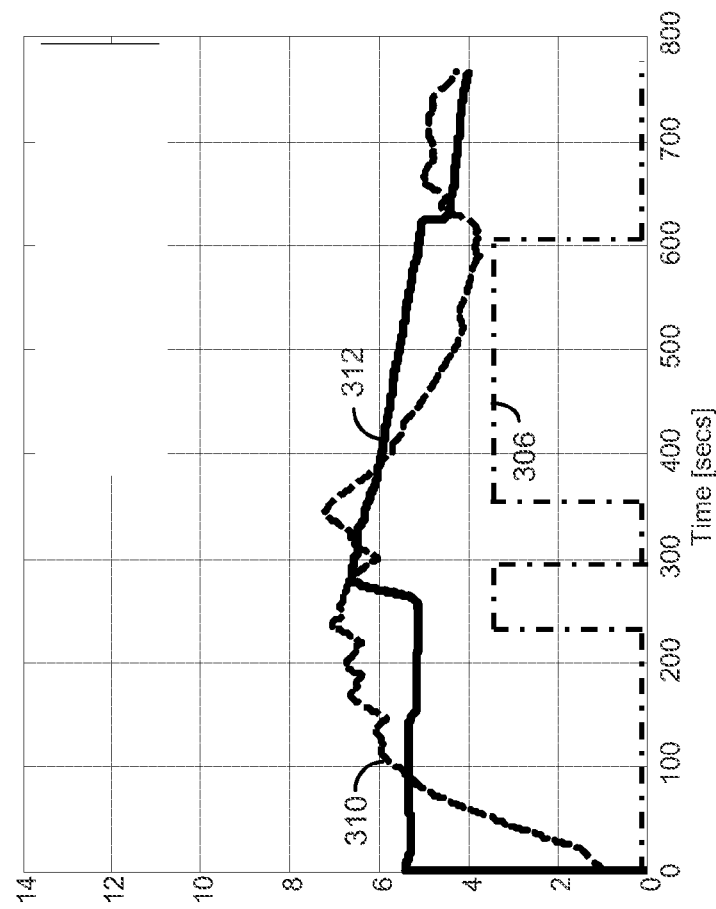
FIGS. 3A-3B show prophetic example data for correcting a $NH_3$ storage amount.
Figure 3A:
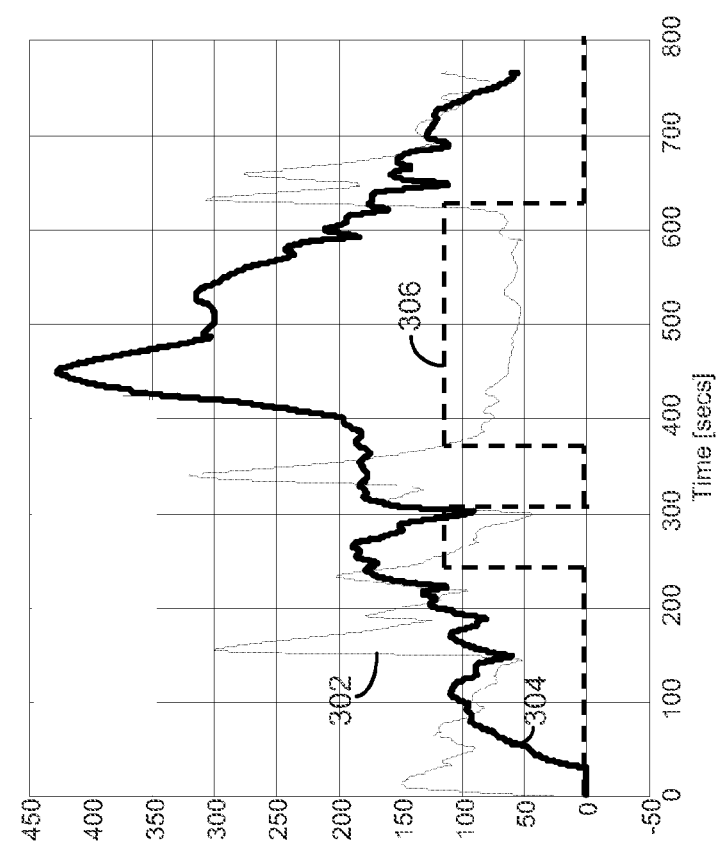
Figure 4:
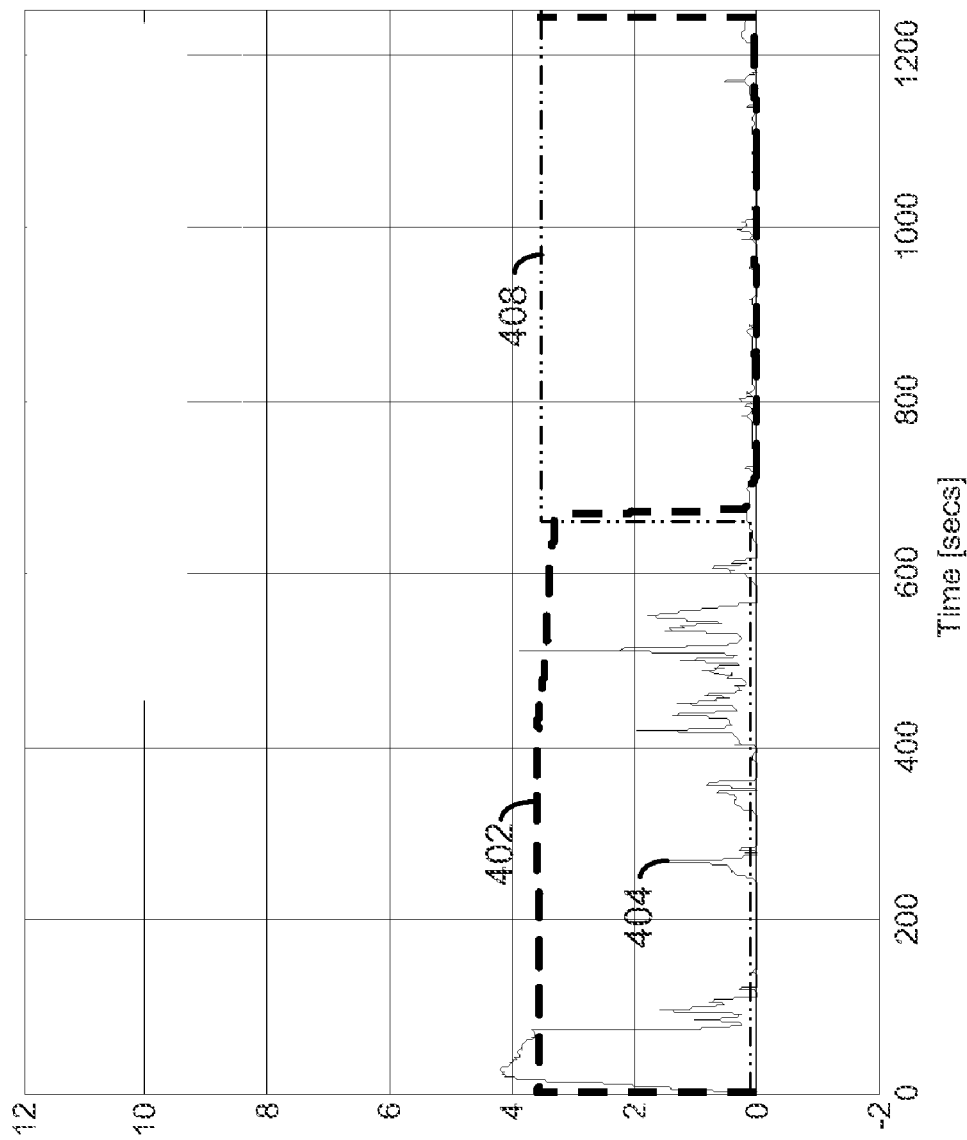
FIG. 4 shows prophetic example of an amount of $NH_3$ stored within a SCR as determined via a $NH_3$ storage model.
Figure 5:
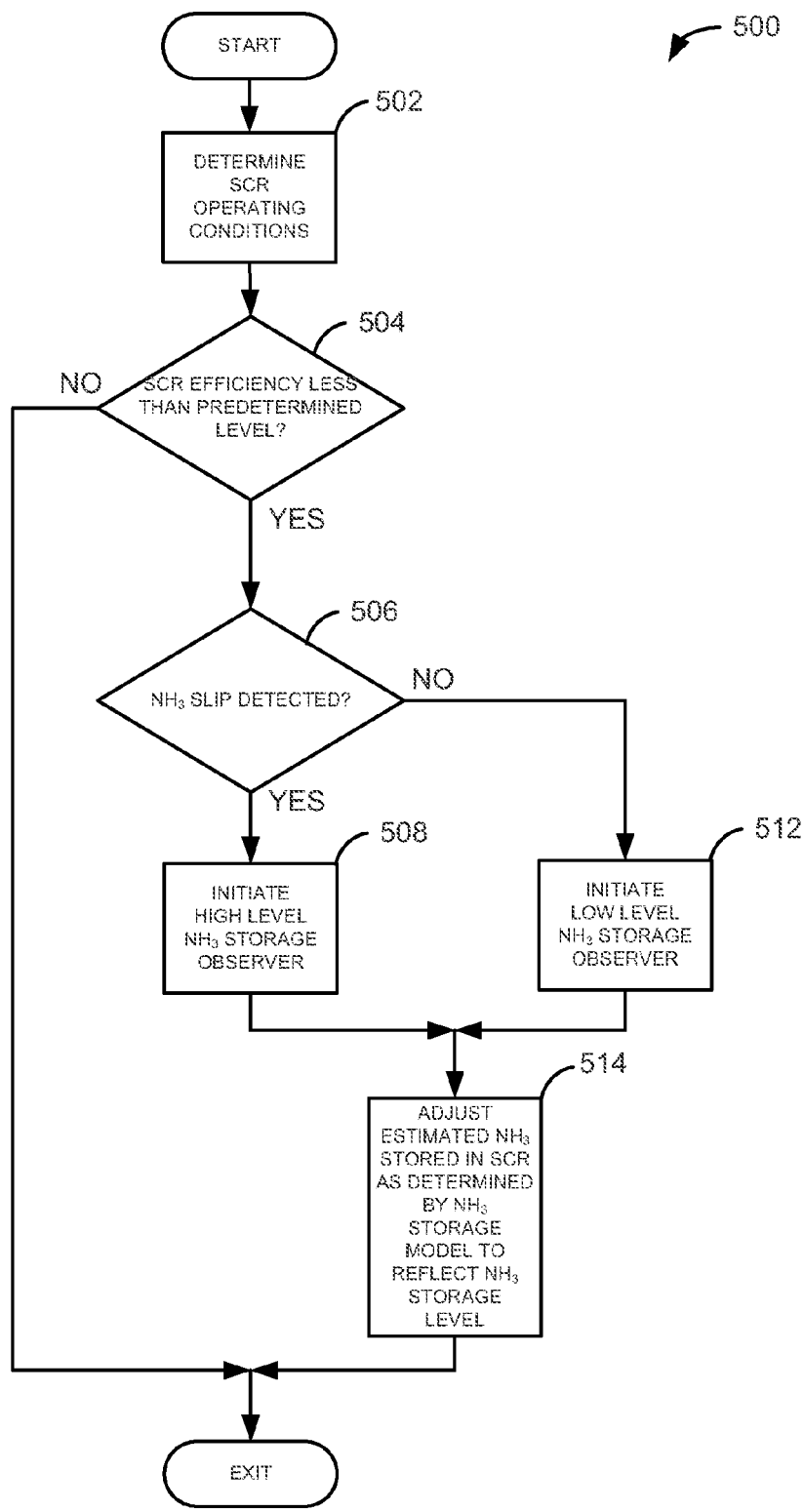
FIG. 5 shows a flowchart for correcting a $NH_3$ storage amount estimated in a $NH_3$ storage model in response to low SCR efficiency.

The present description is related to supplying $NH_3$ to a SCR. In one aspect of the description, an estimate of an amount of $NH_3$ stored within a SCR is corrected via an observer. FIG. 1 shows an example engine system having a SCR for NOx reduction. FIG. 2 shows an example block diagram for a NOx reduction system that is based on an SCR. FIGS. 3A and 3B show prophetic signals of interest for a system having an observer for correcting an estimated amount of $NH_3$ stored within a SCR. FIGS. 4-6 show flowcharts for methods that may be used individually or in combination to correct an estimated amount of $NH_3$ stored within a SCR. FIG. 7 shows a block diagram of a controller for adjusting an amount of $NH_3$ supplied to a SCR.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. Fuel injector 66 is supplied operating current from driver 68 which responds to controller 12.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device 70 in the vicinity of NOx sensor 126. In other examples, NOx sensor 126 may be omitted and an oxygen sensor provided in its place. In still other examples, a second UEGO sensor may be located downstream of one or more exhaust after treatment devices. In the present example, a second NOx sensor 128 is provided downstream of an emissions control device.

Emissions device 70 is shown positioned in the engine exhaust system downstream of turbocharger turbine 164. Emissions device 70 can include a particulate filter and oxidation catalyst bricks, in one example. Alternatively, emissions device 70 may be configured as a SCR. NOx sensor 128 may be moved to a location between emission device 70 and emission device 72 if emissions device 70 is configured as a SCR. Emissions device 72 is shown located downstream of emissions device 70 in the direction of exhaust flow and is configured as an SCR when emissions device 70 is configured as a particulate filter or oxidation catalyst. NOx sensor 128 is shown positioned downstream of emissions device 72 when emissions device 72 is a SCR. In alternative examples, emissions devices 70 and 72 along with NOx sensor 128 may be positioned upstream of turbine 164. $NH_3$ (urea) injector 75 is shown positioned upstream of emission control device 72. $NH_3$ injector 128 may be positioned upstream of emission control device 70 when emissions control device 70 is configured as a SCR. $NH_3$ injector provides liquid $NH_3$ supplied via a pump and $NH_3$ storage tank (not shown) to emission device 72. The liquid $NH_3$ is supplied to emission device 72 such that vaporization of $NH_3$ is promoted.

It should be noted that NOx sensors 126 and 128 have a cross-sensitivity to both NOx and $NH_3$. Thus, when NOx and $NH_3$ are present, the single output from the NOx sensor reflects the combined concentration of NOx and $NH_3$. Further, in some examples NOx sensor 128 may be replaced or augmented by a selective $NH_3$ sensor. For example, NOx sensor 128 may be replaced by a sensor that detects only $NH_3$.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measure of boost pressure from pressure sensor 122; a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by another known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a block diagram of an example SCR control system is shown. Engine 10 supplies exhaust gases to SCR 72 via exhaust pipe 210. Engine operating conditions, amount of $NH_3$ injected to the SCR, correction parameters from observer 204, and SCR operating conditions are input to $NH_3$ storage model 202. As explained in greater detail at FIG. 6, the $NH_3$ storage model outputs an estimate of an amount of $NH_3$ stored within SCR 72 to observer 204 and $NH_3$ control system 206. $NH_3$ control system 206 supplies an electrical signal based on inputs from the $NH_3$ storage model and the engine to operate $NH_3$ injector 75. Observer 204 receives input from NOx sensors 126 and 128 as well as $NH_3$ storage model 202 to determine timing and amount of correction of the amount of $NH_3$ stored in the $NH_3$ storage model 202. Alternatively, a model may replace NOx sensor 126. Observer 204 operates as described in the method of FIG. 5.

Referring now to FIG. 3A, prophetic example data for correcting a $NH_3$ storage amount is shown. In particular, output signals from NOx sensors positioned upstream and downstream of a SCR are shown. Curve 302 represents a signal from a NOx sensor located upstream of the SCR. In one example, the output of the upstream NOx sensor represents a concentration of engine feed gas NOx. Curve 304 represents a signal from a NOx sensor located downstream of the SCR. In one example, the present description provides for recognizing that when an output of a downstream NOx sensor is greater than the upstream NOx sensor, a negative SCR efficiency results and $NH_3$ is known to be slipping by the SCR. Based on knowledge of $NH_3$ slippage, it may be determined that the $NH_3$ stored in the SCR is at the threshold storage capacity (TSC) (e.g., the amount of $NH_3$ the SCR is capable of storing) of the SCR. As such, it may be determined that the amount of $NH_3$ stored in the SCR is greater than or equal to the TSC level. Accordingly, the amount of NH$_3$ stored in the SCR according to the NH$_3$ storage model may be updated during such conditions. Curve 306 reflects timing during SCR operation when the NH$_3$ storage model may be updated. In particular, the times where curve 306 is at a high level denote times where the amount of NH$_3$ determined to be stored at the TSC level. Curve 306 is the time the output of the downstream NOx sensor is higher than the output of the upstream NOx sensor. Consequently, the amount of NH$_3$ estimated to be stored in the SCR as determined by the NH$_3$ storage model may be updated to the TSC or a fraction thereof during this time.

Referring now to FIG. 3B, prophetic examples of an amount of NH$_3$ stored within a SCR as determined via a NH$_3$ storage model and a high storage observer are shown. Curve 310 represents a reference storage value of threshold storage capacity (TSC). The TSC curve varies with the ammonia concentration and the SCR brick temperature. Curve 312 represents a calculated amount of NH$_3$ stored within a SCR according to a model. The calculated NH$_3$ storage level from the model is based on a detailed catalyst model and the observed storage model is the calculated value referenced to TSC under the conditions suitable for observer based correction as discussed below. Curve 306 is the same signal as shown in FIG. 3A, and it represents the times where the amount of NH$_3$ estimated to be stored in the SCR via the NH$_3$ storage model can be updated to the TSC based on determination of NH$_3$ slip (e.g., NH$_3$ passing through a SCR).

At approximately 250 seconds into the plot of FIG. 3B, the amount of NH$_3$ estimate to be stored in the SCR is revised up to the TSC level at the time of the revision. Consequently, the NH$_3$ level determined from the SCR NH$_3$ storage model exhibits a step like change. The step like change is delayed in time from the time signal 306 first goes high and indicates that the NH$_3$ level of the SCR NH$_3$ storage model can be updated. In some examples, the time delay may be the result of low pass filtering signal 306. In other examples, a predetermined amount of time may be required for signal 306 to be at a high state before the NH$_3$ amount in the SCR NH$_3$ model is updated. In this example, the stored NH$_3$ amount determined via the SCR NH$_3$ storage base model is updated at single time to the TSC level. In one example, a predetermined amount of time between updating the SCR NH$_3$ storage model NH$_3$ level to the TSC is required. For example, if the SCR NH$_3$ storage model NH$_3$ level is updated to the TSC, the SCR NH$_3$ storage model NH$_3$ level may not be updated again for a predetermined period of time (e.g., 300 seconds).

In this way, when ammonia slip is detected, the NH$_3$ level determined via the SCR NH$_3$ storage model can be updated to the TSC level. Consequently, the output of SCR NH$_3$ storage model may be adjusted to an expected NH$_3$ storage amount.

Referring now to FIG. 4, a prophetic example of an amount of NH$_3$ stored within a SCR as determined via a NH$_3$ storage model and a low storage observer are shown. Curve 402 represents an estimated value of NH$_3$ stored within a SCR as determined via a NH$_3$ storage model. Curve 404 represents reference storage for low efficiency. Curve 408 represents a low efficiency flag as determined from NOx slip. Thus, when the SCR exhibits low efficiency and no NH$_3$ slip is detected, the estimate of NH$_3$ stored within the SCR can be reduced so as to reflect the revised amount of NH$_3$ stored within the SCR.

Notice that the SCR NH$_3$ estimated amount of NH$_3$ stored within the SCR transitions to a lower amount of NH$_3$ when the low efficiency flag represented via curve 408 indicates a condition of low SCR efficiency.

Thus, output from the SCR NH$_3$ storage model may be adjusted up or down depending on detection of NH$_3$ slip or NOx slip.

Referring now to FIG. 5, a flowchart for correcting a NH$_3$ storage amount estimated in a NH$_3$ storage model in response to low SCR efficiency is shown. The method of FIG. 5 may be executed via instructions residing in controller 10 of FIG. 1, for example.

At 502, method 500 determined SCR operating conditions. In one example, SCR operating conditions may include SCR temperature, NOx concentration and flow rate into the SCR, and NOx concentration and flow rate out of the SCR. The NOx concentrations flowing into and out of the SCR may be determined via NOx sensors that have a cross-sensitivity to NH$_3$. Method 500 proceeds to 504 after SCR operating conditions are determined.

At 504, method 500 judges whether or not efficiency of a SCR in an exhaust system of an engine is less than a predetermined level. In one example, the SCR efficiency may be determined based on the output of a NOx sensor positioned in the exhaust system upstream of the SCR in a direction of exhaust flow and the output of a NOx sensor positioned in the exhaust system downstream of the SCR. In one example, the SCR efficiency may be determine according to the following equation:

$$\eta = 1 - \frac{C_{NOx}^{TP} + \alpha C_{NH3}^{TP}}{C_{NOx}^{FG}}$$

Where $\eta$ represents SCR efficiency, $C_{NOx}^{TP}$ is the concentration of tail pipe NOx (e.g., downstream of the SCR), $\alpha C_{NH_3}^{TP}$ is the concentration of tail pipe NH$_3$ as measured by a tail pipe NOx sensor or a NH$_3$ sensor, and $C_{NOx}^{FG}$ is the concentration of feed gas NOx. Note that a downstream NOx sensor that is sensitive to NOx and NH$_3$ provides an output that may contain both the concentration of NOx and NH$_3$. In some examples, the SCR efficiency may be operated on by a low pass filter so that SCR efficiency signal slows down. The time constant of the low pass filter may be adjusted depending on SCR operating conditions. In other examples, the SCR efficiency may have to be negative for a predetermined amount of time and of a sufficient magnitude (e.g., less than −0.2) before method 500 proceeds. In an alternative example, the upstream NOx sensor output may be replaced by output a NOx model representing a NOx concentration. If the SCR efficiency is less than a predetermined level or value, method 500 proceeds to 506. In one example, the predetermined SCR efficiency is a value less than zero. Otherwise, method 500 exits.

At 506, method 500 judges whether or not NH$_3$ slip is present at a location in the exhaust system downstream of the SCR. In one example, NH$_3$ may be determined to be present when SCR efficiency is less than zero. A SCR efficiency of less than zero may be possible when the SCR efficiency is based on output of a NOx sensor that is cross sensitive to NOx and NH$_3$. NH$_3$ slip may also be determined via a NOx sensor that is cross sensitive to NOx via low pass filtering the concentration of output from downstream NOx sensor and output from the upstream NOx sensor or model. In one example, if the low pass NOx concentration from the downstream NOx sensor minus the low pass NOx concentration from the upstream NOx sensor or model minus a threshold feed gas NOx concentration is greater than zero, NH$_3$ slip may be determined. If method 500 judges that NOx slip is present, method 500 proceeds to 508. Otherwise method 500 proceeds to 512.

In some examples, a determination of $NH_3$ or NOx slip may be provided via a NOx feed gas estimate and a NOx sensor located downstream of a SCR in the direction of exhaust flow. In one example, the method convolves signals from or related to a NOx sensor located upstream of a SCR and a NOx sensor located downstream of the SCR. A convolution $\Delta F^- * \Delta TP$ may be performed on signals from the upstream and downstream NOx sensors. Where $\Delta F^-$ is the forward difference in the output of the upstream or feedgas NOx sensor when the NOx sensor output is decaying, and where $\Delta TP$ is the forward difference in the output of the downstream or tailpipe NOx sensor.

In an alternative example, $NH_3$ slip and NOx slip may be determined via a metric based on convolution is provided to improve NOx and $NH_3$ prediction robustness. The metric is formed via the following equations:

$$\frac{dM}{dt} = (c_1 \Pi_{\Delta F} \times \Delta TP) - (c_2 \times |\Pi_\eta \times \Delta TP|) - c_3 M$$

Where M is a metric for determining whether the output of a NOx sensor located downstream of a first NOx sensor represents NOx or $NH_3$; where $\Pi_{\Delta F}$ is a unit step function for the duration of decaying feedgas NOx ($\Delta F<0$); where $\Pi_\eta$ is a unit step function for the duration when the efficiency of the SCR is <0; where $\Delta TP$ is the forward difference in the TP NOx sensor output or the NOx sensor output downstream of the first NOx sensor (e.g., downstream of a SCR); $c_1$ is an empirically determined calibration coefficient that is greater than zero if $\Delta F<0$ and SCR efficiency $\eta$ is $\geqq 0$, otherwise $c_1$ is zero; $c_2$ is an empirically determined calibration coefficient that is greater than zero if SCR efficiency $\eta$ is $\leqq 0$, otherwise $c_2$ is zero; $c_3$ is an empirically drift gain that is greater than zero if output of a downstream NOx sensor is less than <a threshold downstream NOx sensor level and M<0.

In some examples, the $c_1$ coefficient may be an increasing function in feedgas NOx (e.g., dFGNOx/dt) so that during higher loads, such as during vehicle acceleration, NOx slipping may be established with a higher level of certainty. Alternatively, $c_1$ may be a function of increasing tail pipe NOx. In still other examples, $c_1$ may be a decreasing function of the derivative in demand torque so that $c_1$ increases when the operator releases the accelerator pedal. If NOx is slipping, the tail pipe NOx sensor output signal may rapidly drop during tip-outs (e.g., release of the accelerator pedal), so that NOx and $NH_3$ may be assessed with more certainty.

The above algorithm uses the deterministic $NH_3$ slip case (when tail pipe sensor reads>Feedgas values→η<0) to update the metric at a faster rate (e.g., via gain term $c_2$) thereby guaranteeing convergence to the NH3 slip regime.

Finally, there may be conditions when the $NOx/NH_3$ slip regime transitions rapidly from $NH_3$ to no slip. In such conditions, the metric with a value M<0 (due to prior $NH_3$ slip) may not have an opportunity to heal back since $\Delta TP \sim 0$ forcing a 0 metric update rate. For such conditions, a healing mechanism is introduced via a drift gain $c_3$ that acts to return the metric value to 0 at a fast rate. Method 500 proceeds to 512 after feedgas and tailpipe NOx signals are convolved.

At 512, method 500 initiates operation of a low storage $NH_3$ observer. The low storage $NH_3$ observer reduces the estimate of stored $NH_3$ when the expected NOx conversion is low and no $NH_3$ slip are present. The low storage observer is described as:

$$\frac{d\hat{m}_{NH_3}^{stor}}{dt} = f(m_{NH_3}^{stor}) + \lambda(E(m_{stor}^{NH_3}) - \hat{m}_{NH_3}^{stor})$$

Where $\hat{m}_{NH_3}^{stor}$ is a mass of $NH_3$ as determined by the low storage observer, $f(m_{NH_3}^{stor})$ is the mass of $NH_3$ stored in the SCR as determine via a $NH_3$ storage model, $\lambda$ is a predetermined gain factor for observer updage, and $E(m_{stor}^{NH_3})$ is the minimum expected storage of $NH_3$ for a given SCR efficiency and temperature as measured. Method 500 proceeds to 514 after the low storage $NH_3$ storage observer output is updated.

At 514, the estimated $NH_3$ stored in the SCR as determined with a $NH_3$ storage model is updated. In one example, the amount of $NH_3$ stored in the SCR is estimated according to a model expressed via the following equation:

$$\frac{dm_{NH_3}^{stor}}{dt} = R_{ads} - R_{des} - R_{ox} - R_{red} + \frac{\dot{m}_{NH_3}^{in}}{\tau}$$

Where $m_{NH_3}^{stor}$ is the mass of $NH_3$ stored in the SCR as determined by the model, $R_{ads}$ is the adsorption rate of $NH_3$ by the SCR, $R_{des}$ is the desorption rate of $NH_3$ by the SCR, $R_{ox}$ is the oxidation rate of $NH_3$ by the SCR, $R_{red}$ is the reduction rate of $NH_3$ by the SCR, and $\dot{m}_{NH_3}^{in}$ is the mass flow rate of $NH_3$ into the SCR, and $\tau$ is a residence time of the $NH_3$ in the SCR. Note that each R in the model is defined by the Arrhenius equation:

$$R_{xx} = k_{xx} \exp\left(-\frac{E_{xx}}{RT}\right)$$

where $R_{xx}$ is the rate of reaction, $k_{xx}$ is a number of molecular collisions, R is the gas constant, $E_a$ is the activation energy, and T is the temperature in degrees Kelvin.

Thus, the present amount of $NH_3$ stored within the SCR as estimated by the SCR $NH_3$ storage model can be revised so as to adjust present and future estimated amounts of $NH_3$ stored in the SCR. Method 500 exits after the amount of $NH_3$ stored in the SCR according to the SCR $NH_3$ model is revised.

At 508, method 500 initiates the high level $NH_3$ storage observer. The high level $NH_3$ observer is the basis for adjusting the estimate of stored $NH_3$ when the SCR efficiency is less than a predetermined amount and when $NH_3$ slip is present. In one example, the amount of $NH_3$ stored in the SCR is estimated according to a model expressed via the following equation:

$$\frac{d\hat{m}_{NH_3}^{stor}}{dt} = f(m_{NH3}^{stor}) + \lambda(TSC - \hat{m}_{NH3}^{stor})$$

Where $f(m_{NH_3}^{stor})$ is a mass of $NH_3$ calculated via a base $NH_3$ storage model (e.g., 202 of FIG. 2), where $\hat{m}_{NH_3}^{stor}$ is a mass of $NH_3$ stored within the SCR as determined by the high storage observer, where $\lambda$ is the observer gain, and where TSC is the threshold storage capacity of the SCR. In some examples, the observer gain may be an integrated amount of the $NH_3$ slip magnitude that is limited between a first and second threshold level of gain. In other example, the observer gain may be proportional to the $NH_3$ slip magnitude. The TSC amount may be empirically determined and may be expressed as a function of vehicle distance traveled or operating time. Method 500 proceeds to 514 after updating the high storage observer $NH_3$ storage estimate.

Referring now to FIG. 6, a block diagram of a controller for supplying $NH_3$ to a SCR is shown. At 602, the mass of $NH_3$ injected to the SCR is determined. In one example, the mass of $NH_3$ is based on an amount of time an injector is activated and a transfer function that describes flow through the injector at a given temperature and pressure. In other example, the mass of $NH_3$ may be retrieved directly from a method that determines the amount of $NH_3$ to inject to the SCR based on engine and SCR operating conditions. For example, the mass of $NH_3$ injected may be updated after a new mass of $NH_3$ to be injected is determined at 620.

At 606, an observer may determine an amount of $NH_3$ stored in a SCR. In one example, the observer is of the form described in FIG. 5. Thus, the observer may include a plurality of observers that revise the estimate of $NH_3$ stored within an SCR based on different operating conditions of the SCR.

At 604, a model estimates the amount of $NH_3$ stored within a SCR. The amount of $NH_3$ injected to the SCR, the observer $NH_3$ estimate, and SCR temperature are the basis for the model estimating an amount of $NH_3$ stored within the SCR. In one example, the model estimating the amount of $NH_3$ stored within the SCR is as described at 514 of FIG. 5. The model outputs an estimated mass of $NH_3$ stored within the SCR. A desired mass of $NH_3$ stored in the SCR from 610 is subtracted from the mass of $NH_3$ estimated via the SCR $NH_3$ model at 616. The result is an error in the amount of $NH_3$ stored in the SCR. The desired amount of $NH_3$ stored in the SCR may be empirically determined. In one example, the desired amount of $NH_3$ stored in the SCR is stored in a table that may be indexed according to SCR temperature and engine operating conditions (e.g., engine speed and load).

At 612, NOx efficiency of the SCR is determined. In one example, NOx efficiency of the SCR is determine according to the equation described at 504 of FIG. 5. The NOx efficiency of the SCR may be based on NOx sensors located upstream and downstream of a SCR as shown in FIG. 1. Alternatively, NOx efficiency of the SCR may be based on a modeled NOx feed gas and output of a NOx sensor positioned downstream of the SCR. A desired NOx efficiency from 614 is subtracted from the NOx efficiency of the SCR from 614 at 618. The result is an error in the SCR NOx conversion efficiency. The desired NOx conversion efficiency of the SCR may be empirically determined. In one example, the desired NOx conversion efficiency of the SCR is stored in a table that may be indexed according to SCR temperature and engine operating conditions (e.g., engine speed and load).

At 620, the error amounts from 616 and 618 are used to index a table that contains a mass of $NH_3$ to inject based on the $NH_3$ storage error and the SCR NOx efficiency error. The table output the mass of $NH_3$ to inject to the SCR. The mass of $NH_3$ is converted to an injector on time given the pressure of the liquid $NH_3$ (urea) supplied to the injector.

At 622, an injector is operating by supplying a voltage or current control signal to the injector. The signal causes the injector to open and release $NH_3$ to the exhaust system at a location upstream of a SCR. In one example, the injector is located as described in FIG. 1.

At 624, the $NH_3$ combined with the SCR acts to reduce NOx to $N_2$ and $H_2O$. Input to the SCR and output of the SCR may be monitored via NOx sensors as described in FIG. 1. In an alternative example, $NH_3$ sensors may be positioned downstream of the SCR. The NOx sensors or the $NH_3$ sensor provide feedback to 612 and 606.

In this way, output from observer 616 can correct an estimated amount of $NH_3$ stored within a SCR so that an amount of $NH_3$ injected to the SCR may be corrected. Further, the observer may be configured to operate at selected times when the probability of establishing a more accurate estimate of $NH_3$ storage on the SCR increases.

Thus, the method of FIGS. 5 and 6 provide for a method for correcting an estimate of $NH_3$ stored within a SCR, comprising: correcting an estimated amount of $NH_3$ stored within the SCR in response to an indication of $NH_3$ slip; and adjusting an amount of $NH_3$ delivered to the SCR in response to the corrected estimated amount of $NH_3$ stored within the SCR. The method including where the indication of $NH_3$ slip is determined via outputs of two NOx sensors or via a NOx model and a NOx sensor. The method includes where the indication of $NH_3$ slip is determined via a negative SCR efficiency based on the outputs of the two NOx sensors or based on the NOx model and the NOx sensor. The method includes where the indication of $NH_3$ slip is determined via a correlation between the output of the first NOx sensor and the output of the second NOx sensor. The method includes where the indication of $NH_3$ slip is based on output of a $NH_3$ sensor. In another example, the method includes where the amount of $NH_3$ stored is corrected to a threshold SCR storage capacity, and where an amount of correction of the estimated amount of $NH_3$ stored is based on at integrated $NH_3$ slip magnitude. The method includes where the amount of $NH_3$ stored is corrected when the indication of $NH_3$ is present for greater than a predetermined amount of time. The method includes where the estimated amount of $NH_3$ stored within the SCR in response to an indication of $NH_3$ slip from at least one NOx sensor is adjusted up to a threshold $NH_3$ storage capacity of the SCR based on an observer.

In addition, the methods of FIGS. 5 and 6 provide for correcting an estimate of $NH_3$ stored within a SCR, comprising: correcting an estimated amount of $NH_3$ stored within the SCR based on an expected storage amount of $NH_3$, the expected storage amount related to an efficiency and temperature of the SCR, the estimated amount of $NH_3$ stored within the SCR corrected in response to an absence of indication of $NH_3$ slip past the SCR and an indication of $NO_x$ slip past the SCR greater than a threshold level, absence of $NH_3$ slip indication and presence of NOx slip provided via at least one NOx sensor; and adjusting an amount of $NH_3$ delivered to the SCR in response to the corrected estimated amount of $NH_3$ stored within the SCR. Thus, the approach can adjust the estimate of $NH_3$ stored on a SCR whether or not there is $NH_3$ slip past the SCR. The method includes where the at least one NOx sensor includes a NOx sensor located within an exhaust system at a location downstream of the SCR and where the correction of the estimated amount of $NH_3$ stored within the SCR is based on an observer, and further comprising correcting the estimated amount of $NH_3$ stored within the SCR to a threshold storage capacity in response to an indication of $NH_3$ slip past the SCR. The method further comprises estimating or sensing engine feed gas NOx, and further comprising adjusting the amount of $NH_3$ delivered to the SCR in response to NOx slip past the SCR. The method includes where the SCR efficiency is based on a difference in engine feed gas NOx and an output from the NOx sensor located within the exhaust system at a location downstream of the SCR. The method also includes where the absence of indication of $NH_3$ slip is based on a difference between the feed gas NOx and an output of the from the NOx sensor located within the exhaust system at a location downstream of the SCR exceeding a threshold level.

The method also includes where the correction of the estimated amount of $NH_3$ stored within the SCR in response to the absence of indication of $NH_3$ slip from at least one NOx sensor is performed during selected SCR operating conditions. The method includes where the estimated amount of $NH_3$ stored within the SCR in response to the absence of indication of $NH_3$ slip from at least one NOx sensor is adjusted to a reduced estimated amount of $NH_3$. The method includes where the estimated amount of $NH_3$ stored within the SCR in response to the absence of indication of $NH_3$ slip from at least one NOx sensor is adjusted to a reduced estimated amount of $NH_3$ absent a $NH_3$ specific sensor.

The methods of FIGS. 5 and 6 also provide for correcting an estimate of $NH_3$ stored within a SCR, comprising: estimating an amount of $NH_3$ stored within the SCR; correcting an estimated amount of $NH_3$ stored within the SCR in response to an indication of $NH_3$ slip, the indication of $NH_3$ provided via one or more NOx sensors; and adjusting an amount of $NH_3$ injected to the SCR in response to the corrected amount of $NH_3$ stored within the SCR. The method includes where the amount of $NH_3$ injected to the SCR is decreased in response to the estimated amount of $NH_3$ decreasing, and where the correcting the estimated amount of $NH_3$ is based on an observer. The engine system includes where the observer includes a gain that is based on a magnitude of $NH_3$ slip. The engine system includes where an output of the observer is based on an expected $NH_3$ storage amount based on an efficiency of the SCR.

As will be appreciated by one of ordinary skill in the art, the methods described in FIGS. 5-6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for correcting an estimate of $NH_3$ stored within a SCR, comprising:
   correcting an estimated amount of $NH_3$ stored within the SCR in response to an indication of $NH_3$ slip, the indication of $NH_2$ slip determined via a metric based on a convolution; and
   adjusting an amount of $NH_3$ delivered to the SCR in response to the corrected estimated amount of $NH_3$ stored within the SCR.

2. The method of claim 1, where the convolution is determined via outputs of two NOx sensors or via a NOx model and a NOx sensor.

3. The method of claim 2, where the indication of $NH_3$ slip is determined via a negative SCR efficiency based on the outputs of the two NOx sensors or based on the NOx model and the NOx sensor.

4. The method of claim 2, where the two NOx sensors include a NOx sensor positioned upstream of the SCR and a NOx sensor positioned downstream of the SCR.

5. The method of claim 1, where the indication of $NH_3$ slip is based on output of a $NH_3$ sensor.

6. The method of claim 1, where the estimated amount of $NH_3$ stored is corrected to a threshold SCR storage capacity, and where an amount of correction of the estimated amount of $NH_3$ stored is based on an integrated $NH_3$ slip magnitude.

7. The method of claim 1, where the estimated amount of $NH_3$ stored is corrected when the indication of $NH_3$ slip is present for greater than a predetermined amount of time.

8. The method of claim 1, where the estimated amount of $NH_3$ stored within the SCR in response to an indication of $NH_3$ slip from at least one NOx sensor is adjusted up to a threshold $NH_3$ storage capacity of the SCR based on output of a model corrected via an observer.

9. A method for correcting an estimate of $NH_3$ stored within a SCR, comprising:
   correcting an estimated amount of $NH_3$ stored within the SCR based on an expected storage amount of $NH_3$, the expected storage amount related to an efficiency and temperature of the SCR, the estimated amount of $NH_3$ stored within the SCR corrected in response to an absence of indication of $NH_3$ slip past the SCR and an indication of $NO_x$ slip past the SCR greater than a threshold level, absence of $NH_3$ slip indication and presence of NOx slip provided via at least one NOx sensor, and a metric based on convolution; and
   adjusting an amount of $NH_3$ delivered to the SCR in response to the corrected estimated amount of $NH_3$ stored within the SCR.

10. The method of claim 9, where the at least one NOx sensor includes a NOx sensor located within an exhaust system at a location downstream of the SCR and where the correction of the estimated amount of $NH_3$ stored within the SCR is based on a model corrected via an observer, and further comprising correcting the estimated amount of $NH_3$ stored within the SCR to a threshold storage capacity in response to the indication of $NH_3$ slip past the SCR.

11. The method of claim 10, further comprising estimating or sensing engine feed gas NOx, and further comprising adjusting the amount of $NH_3$ delivered to the SCR in response to NOx slip past the SCR.

12. The method of claim 11, where the SCR efficiency is based on a difference in engine feed gas NOx and an output from the NOx sensor located within the exhaust system at the location downstream of the SCR.

13. The method of claim 11, where the absence of indication of $NH_3$ slip is based on a difference between the engine feed gas NOx and an output from the NOx sensor located within the exhaust system at the location downstream of the SCR exceeding a threshold level.

14. The method of claim 9, where the correction of the estimated amount of $NH_3$ stored within the SCR in response to the absence of indication of $NH_3$ slip from the at least one NOx sensor is performed during selected SCR operating conditions.

15. The method of claim 9, where the estimated amount of $NH_3$ stored within the SCR in response to the absence of indication of $NH_3$ slip from the at least one NOx sensor is adjusted to a reduced estimated amount of $NH_3$.

16. The method of claim 15, where the estimated amount of $NH_3$ stored within the SCR in response to the absence of indication of $NH_3$ slip from the at least one NOx sensor is adjusted to a reduced estimated amount of $NH_3$ absent a $NH_3$ specific sensor.

17. A method for correcting an estimate of $NH_3$ stored within a SCR, comprising:

estimating an amount of $NH_3$ stored within the SCR;

correcting an estimated amount of $NH_3$ stored within the SCR in response to an indication of $NH_3$ slip, the indication of $NH_3$ provided via a metric based on convolution of one or more NOx sensors; and adjusting an amount of $NH_3$ injected to the SCR in response to the corrected amount of $NH_3$ stored within the SCR.

18. The method of claim 17, where the amount of $NH_3$ injected to the SCR is decreased in response to the estimated amount of $NH_3$ decreasing, and where the correcting the estimated amount of $NH_3$ is based on a model corrected via an observer.

19. The engine system of claim 18, where the observer includes a gain that is based on a magnitude of $NH_3$ slip.

20. The engine system of claim 18, where an output of the observer is based on an expected $NH_3$ storage amount based on an efficiency of the SCR.

* * * * *